(12) United States Patent
Ma

(10) Patent No.: US 12,314,621 B2
(45) Date of Patent: May 27, 2025

(54) CONTROL METHOD, APPARATUS, AND ELECTRONIC DEVICE

(71) Applicant: Lenovo (Beijing) Limited, Beijing (CN)

(72) Inventor: Binqiang Ma, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/529,805

(22) Filed: Dec. 5, 2023

(65) Prior Publication Data

US 2024/0220179 A1   Jul. 4, 2024

(30) Foreign Application Priority Data

Dec. 28, 2022   (CN) .......................... 202211695801.5

(51) Int. Cl.
*G06F 3/14*   (2006.01)
*G06F 21/84*   (2013.01)

(52) U.S. Cl.
CPC ............ *G06F 3/1423* (2013.01); *G06F 21/84* (2013.01)

(58) Field of Classification Search
CPC ..................................... G06F 1/1677
See application file for complete search history.

(56) References Cited

U.S. PATENT DOCUMENTS

2020/0073611 A1\* 3/2020 Tanabe .................... G06F 1/163

\* cited by examiner

*Primary Examiner* — Nan-Ying Yang
(74) *Attorney, Agent, or Firm* — ANOVA LAW GROUP, PLLC

(57) ABSTRACT

A control method for controlling an electronic device includes sending first control information by a target application. The first control information is used to cause a first screen to enter a first state. In the first state, an operating system is not able to control the first screen, and the first screen remains electrically connected to a processor. The processor is configured to run the operating system.

13 Claims, 4 Drawing Sheets

CONTROL METHOD, APPARATUS, AND ELECTRONIC DEVICE

CROSS-REFERENCE TO RELATED APPLICATION

The present disclosure claims priority to Chinese Patent Application No. 202211695801.5, filed on Dec. 28, 2022, the entire content of which is incorporated herein by reference.

TECHNICAL FIELD

The present disclosure relates to the computer field and, more particularly, to a control method, an apparatus, and an electronic device.

BACKGROUND

With the development of electronic devices, an electronic device often has a plurality of screens.

Currently, when a user uses an electronic device, the plurality of screens all display content. When the user does not want a certain screen to display content, if the screen still displays the content, private information of the user can be seen by another person, which results in a potential privacy breach for the user.

SUMMARY

A first aspect of the present invention provides a control method. The method includes sending first control information by a target application. The first control information is used to cause a first screen to enter a first state. In the first state, an operating system is not able to control the first screen, and the first screen remains to be electrically connected to a processor. The processor is configured to run the operating system.

A second aspect of the present disclosure provides a control method. The method includes receiving first control information by a firmware system and responding to the first control information by the firmware system to perform a target operation to cause a first screen to enter a first state. In the first state, the operating system is not able to control the first screen, and the first screen remains to be electrically connected to a processor. The processor is configured to run an operating system.

A third aspect of the present disclosure provides a control apparatus, including a first sending circuit and a processor. The processor is configured to run an operating system and control the first sending circuit to send first control information. The first control information is used to cause a first screen to enter a first state. In the first state, the operating system is not able to control the first screen, and the first screen remains to be electrically connected to a processor.

A fourth aspect of the present disclosure provides an electronic device, including a processor, a first screen, and a firmware system. The processor is configured to run an operating system. The first screen is controlled by the operating system. The firmware system is configured to respond to first control information to perform a target operation to cause the first screen to enter a first state. In the first state, the operating system is not able to control the first screen, and the first screen remains to be electrically connected to the processor. The first control information is sent by a target application in the operating system.

DETAILED DESCRIPTION OF THE EMBODIMENTS

The technical solution of the present disclosure is described in detail below in connection with the accompanying drawings and embodiments of the present disclosure. The described embodiments are merely some embodiments of the present disclosure not all embodiments. Based on embodiments of the present disclosure, all other embodiments obtained by those skilled in the art without creative efforts are within the scope of the present disclosure.

Embodiments of the present disclosure provide a control method, an apparatus, and an electronic device, which solve the problem that when the user does not want a certain screen of the electronic device to display content, but the screen still displays the content to cause the privacy information of the user to be seen by other people, i.e., the potential privacy breach for the user. The target application can send first control information to cause a first screen that does not need to display the content to enter a first state. Thus, the operating system cannot control the first screen. That is, the first screen will not display the content. Thus, the problem of the privacy breach can be avoided.

Figure 1:
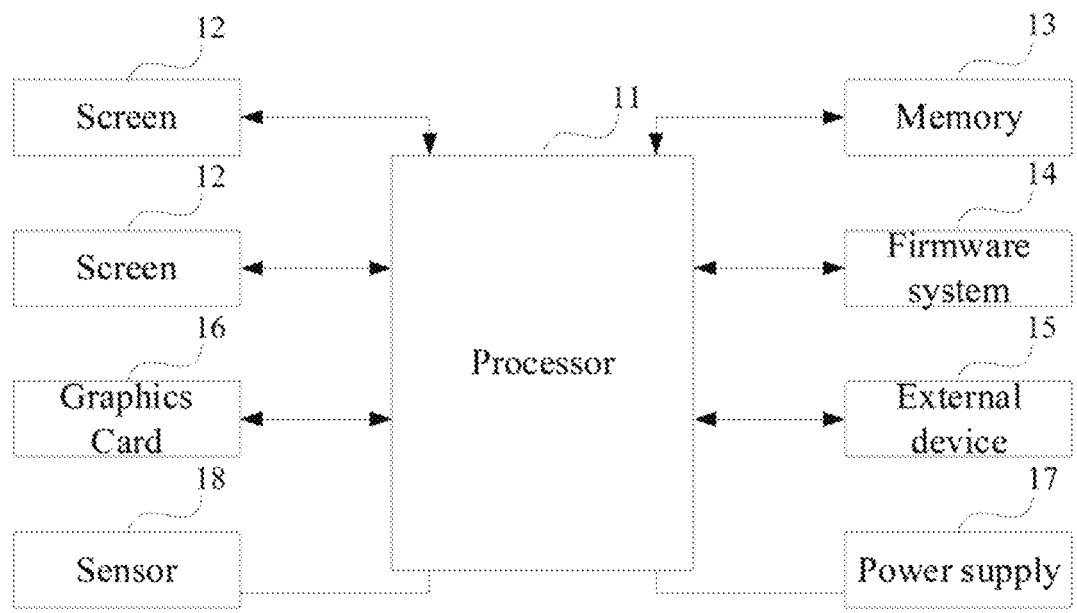
FIG. 1 illustrates a schematic structural diagram of an electronic device according to some embodiments of the present disclosure.

FIG. 1 illustrates a schematic structural diagram of an electronic device according to some embodiments of the present disclosure.

The structure of the electronic device shown in FIG. 1 does not limit the electronic device. The electronic device can include more or fewer members than those shown in FIG. 1, or a combination of some members, or different members.

In some embodiments, the electronic device includes a processor 11, one or more screens 12, a memory 13, and a firmware system 14.

In some embodiments, the memory 13 can be used to store software programs and data. The processor 11 can be configured to perform the software programs and data stored in the memory 13 to perform various functions of the electronic device and perform data processing. The memory 13 can include a program storage area and a data storage area. The program storage area can store an operating system and an application required for at least one function (e.g., a function for controlling the electronic device to enter a sleep mode). The data storage area can store data created during the application of the electronic device (such as picture information displayed on the screen). In addition, the memory 13 can be a high-speed random-access memory or a non-volatile memory, such as at least one disk storage device, a flash memory device, or another non-volatile solid-state memory device.

In some embodiments, the firmware system 14 can be included in the memory 13 or be separate from the memory 13. The firmware system 14 provides lowest-level and most direct hardware settings and controls for the electronic device. The firmware system 14 can control operations of all hardware in the electronic device and provide basic calls to higher-level software.

In some embodiments, the firmware system 14 can include a storage unit.

In some embodiments, the processor 11 can be a control center of the electronic device. The processor 11 can be connected to various members of the entire electronic device through various interfaces and wirings. The processor 11 can run or perform the software programs and/or data stored in the memory 13 to perform the various functions and data processing of the electronic device to monitor the entire electronic device. The processor 11 can include a calculator, a register, and a controller, and can be configured to perform related operations to realize the technical solution of embodiments of the present disclosure.

In some embodiments, the electronic device further includes some external devices 15, such as an input device configured to receive digital information, character information, or a touch operation and non-touch gesture that are input to generate a signal input related to user settings and function control of the electronic device.

In some embodiments, the external device can also include one or more external screens.

In some embodiments, the screens, such as the first screen and the second screen, of embodiments of the present disclosure can be the external screens. In some embodiments, some of the screens, such as the first screen and the second screen, of embodiments of the present disclosure can be external screens, and some of the screens, such as the first screen and the second screen, of embodiments of the present disclosure can be screens 12 of the electronic device. In some embodiments, the screens, such as the first screen and the second screen, of embodiments of the present disclosure can be screens 12 of the electronic device.

In some embodiments, the screen 12 or the external screen can be configured to display information input by the user, information provided to the user, and various menu interfaces of the electronic device. The screen 12 can be mainly configured to display the target content of the electronic device in embodiments of the present disclosure. In some embodiments, the screen 12 or the external screen can be a liquid crystal display (LCD), or organic light-emitting diode (OLED), or an electronic ink screen. In some other embodiments, a touch panel can cover the screen 12 or an external screen to form a touch display.

In some embodiments, the electronic device further includes a graphics card 16, which converts a digital signal input into the electronic device into an analog signal and causes the screen to display the converted analog signal. The graphics card 16 can also have an image processing capability. The processed image can be displayed on the screen.

In addition, the electronic device further includes a power source 17 configured to provide power to other modules. The electronic device can further include one or more sensors 18, such as an image sensor, a brightness sensor, a light sensor, a GPS sensor, an infrared sensor, etc. The electronic device can also include a wireless radio frequency (RF) circuit configured to perform network communication with a wireless network device. The electronic device can further include a WiFi module configured to perform WiFi communication with other devices to obtain images or data transferred by the other devices.

In some embodiments, the electronic device can be any type of electronic product that can interact with the user through one or more of a keyboard, a touch panel, a touch screen, a remote controller, a voice interaction, or a handwriting device. The electronic device can include a cellphone, a tablet, a handheld computer, a personal computer, a wearable device, a smart TV, etc.

Figure 2:
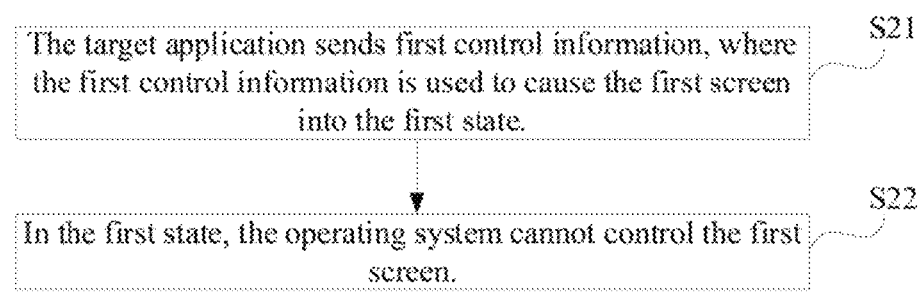
FIG. 2 illustrates a schematic diagram of a control method applied to a target application according to some embodiments of the present disclosure.

The control method of embodiments of the present disclosure is described below in connection with the structure of the electronic device. FIG. 2 illustrates a schematic diagram of a control method applied to a target application according to some embodiments of the present disclosure. The method includes process S21 and process S22 during implementation.

At S21, the target application sends first control information, where the first control information is used to cause the first screen into the first state.

At S22, in the first state, the operating system cannot control the first screen. When the first screen enters the first state, the first screen remains electrically connected to the processor. The processor can be configured to run the operating system.

In some embodiments, the target application can be stored in the memory 13, and the processor can run the target application stored in the memory 13. The target application can send the first control information during the operation.

In some embodiments, the target application can be any type of application, such as a video application, a news application, a comic application, a communication application, etc. In some embodiments, a plurality of manners can be used to realize "the operating system being unable to control the first screen that enters the first state." Embodiments of the present disclosure provide, but are not limited to, the following two methods.

A first implementation method includes the following process A11 and process A12.

At A11, if the graphics card receives the first control information, the graphics card resets the graphics card driver to trigger the operating system to load first attribute information of the screen again. The first control information includes a screen identifier of the first screen.

In some embodiments, the first attribute information can include parameters that enable the screen to display content properly. For example, the first attribute information can include but is not limited to Extended Display Identification Data (EDID).

At A12, the operating system does not obtain the first attribute information corresponding to the screen identifier of the first screen, thus being unable to control the first screen.

In some embodiments, a correspondence between the screen identifier and the first attribute information can be pre-stored in the memory. The first control information can include the screen identifier of the first screen.

The second implementation method can include processes A21 to A23.

At A21, the firmware system receives the first control information.

At A22, the firmware system modifies the first attribute information of the first screen in response to the first control information.

For example, the firmware system can include a Basic Input Output System (BIOS). The BIOS can store a most critical basic input-output program, system configuration information, a self-test program after startup, and a system self-start program.

In some embodiments, the correspondence between the screen and the first attribute information can be stored in the storage unit of the memory or the firmware system.

In some embodiments, the processor can load the BIOS from the firmware system to grant the BIOS with control authority. The BIOS with the control authority can modify the first attribute information stored in the storage unit of the memory or the firmware system.

In some embodiments, the System Management Interruption (SMI) can be triggered to grant the BIOS with the control authority.

In some embodiments, the SMI can be triggered through Windows Management Instrumentation (WMI). The WMI is a core Windows management technology that can be used to manage local and remote electronic devices, and access, configure, and monitor Windows resources. The WMI can be based on the Common Information Model Object Manager (CIMOM), which is an object database that describes units of the operating system and provides a common interface for the Microsoft Management Console (MMC) and script programs to access the units of the operating system.

In some embodiments, if the first attribute information includes the display attribute of the EDID, the display attribute of the EDID of the first screen can be modified to hidden.

At A23, the operating system determines a control situation over the first screen by reading the first attribute information.

In some embodiments, a plurality of methods can be provided to trigger the operating system to perform process A23. Embodiments of the present disclosure can include but are not limited to the following two methods.

In a first method, after the BIOS modifies the first attribute information of the first screen, the BIOS can control the graphics card to reset the graphics card driver to trigger the operating system to reload the first attribute information of the screen, i.e., performing process A23.

In a second method, the target application can send the second control information. The second control information can be used to instruct the operating system to read the first attribute information from the storage unit of the firmware system. That is, after the operating system receives the second control information, process A23 can be performed.

In some embodiments, after the firmware system modifies the first attribute information of the first screen, the firmware system can send successful modification feedback to the target application. After receiving the feedback, the target application can send the second control information.

In some embodiments, the target application can send the second control information after sending the first control information.

In both the first method and the second method, the electronic device does not need to be restarted.

In some embodiments, if the first attribute information of the first screen includes the display attribute as hidden, the operating system cannot control the first screen. If the first attribute information of the first screen includes the display attribute as non-hidden, the operating system can control the first screen.

In some embodiments, a plurality of implementation methods can be provided for the target application to send the first control information. Embodiments of the present disclosure can provide but are not limited to the following two methods.

A first implementation method includes process B11 and process B12.

At B11, the target application receives a first switch signal. The first switch signal is used to indicate of switching the target screen of the electronic device from the first screen to the second screen. The target screen is a screen for displaying the target content.

At B12, the target application sends the first control information in response to the first switch signal.

The first control information can be information sent by the target application in response to the first switch signal.

In some embodiments, one or more first screens can be provided, and one or more second screens can be provided.

In some embodiments, the first screen and the second screen can be different screen areas of a same screen. In some other embodiments, the first screen and the second screen can be different screens. In still some other embodiments, the first screen and the second screen can be virtual screens or physical screens.

In some embodiments, a plurality of methods of generating the first switch signal can be provided. Embodiments of the present disclosure provide but are not limited to the following three methods.

In a first method for generating the first switch signal, if the user clicks a physical button of the electronic device or clicks a virtual button displayed on the target screen of the electronic device, the first switch signal can be generated.

In a second method for generating the first switch signal, an external device connected to the electronic device, such as an external screen or remote controller, can send the first switch signal to the electronic device.

In a third method for generating the first switch signal, a position change structure in the electronic device can trigger the first switch signal.

In some embodiments, the first screen and the second screen are arranged on the electronic device. The first switch signal can be triggered by the position change structure. The position change structure can be configured to cause the second screen to move to the target position to be used as the target screen.

In some embodiments, the position change structure can change the position of the first screen and the position of the second screen at the electronic device. When the position of the first screen and the position of the second screen at the electronic device change, the target screen for displaying the target content can also change. Thus, the position change structure can trigger the generation of the first switch signal.

To help those skilled in the art better understand how the position change structure triggers the first switch signal of embodiments of the present disclosure. An example is provided below.

Figure 3:
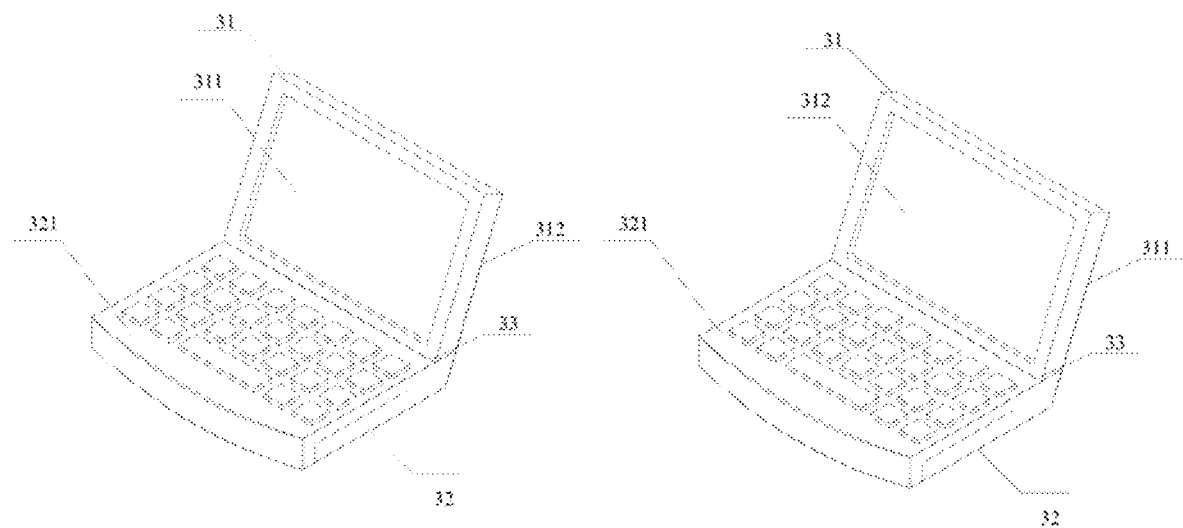
FIG. 3 illustrates a schematic diagram of an electronic device according to some embodiments of the present disclosure.

As shown in FIG. 3, the electronic device includes a first body 31 and a second body 32. A first surface 311 of the first body includes a screen, and a second surface 312 of the first body includes a screen. The second body 32 is connected to the first body 31 through a position change structure 33.

Before changing the positions of the two screens through the position change structure 33, the positions of the two screens at the electronic device are shown on a left side of FIG. 3. The target screen for displaying the target content is the screen located on the first surface 311 of the first body. After changing the positions of the two screens through the position change structure 33, the positions of the two screens at the electronic device are shown on a right side of FIG. 3. Then, the target screen for displaying the target content is changed to the screen located on the second surface 312 of the first body. That is, the position change structure can trigger the first switch signal.

After those skilled in the art understand that the position change structure can trigger the first switch signal, the method of triggering the generation of the first switch signal through the position change structure can be described below. In some embodiments, the method includes process B111 to process B113.

At B111, first position relationship of a plurality of screens is determined, and the current target screen is determined based on the first position relationship.

At B112, second position relationship of the plurality of screens that is changed by the position change structure is determined.

At B113, Based on the second positional relationship, the screen to display the target content is determined, and the first switch signal is generated.

Assume that the current target screen in step B111 is the first screen, and the target content for the screen to display determined in B113 is the second screen, the first switch signal can be used to indicate switching the target screen of the electronic device from the first screen to the second screen.

A second implementation method includes process B21 and process B22.

At B21, display information of the plurality of screens is obtained.

In some embodiments, the display information of a screen can include, but is not limited to, at least one of a resolution, a screen size, or a screen position.

At B22, a screen with the display information satisfying a determined screen condition is determined as the first screen, and the first control information is sent out.

In some embodiments, the determined screen condition can include, but is not limited to, at least one of the resolution being highest, the screen size being largest, or the position of the screen being in the target position.

The third implementation method includes process B31 or process B32.

At B31, if the target application detects an input for hiding the screen, the screen associated with the input is determined as the first screen.

In some embodiments, the screen that receives the input can be determined as the first screen. For example, if the user needs to hide the first screen, a relevant operation may need to be performed on the first screen.

At B32, if the target application detects an input for hiding the screen, the screen with the screen identifier included in the input is determined as the first screen.

That is, the user can input the screen identifier for the screen that needs to be hidden.

The fourth implementation method includes process B41 and process B42.

At B41, the processor determines an operation mode in which the electronic device is. The operation mode includes, but is not limited to, a tablet mode and a desktop mode.

As shown in FIG. 3, in the tablet mode, an angle between the first body and the second body is in the range [70°, 180° ]. The first screen corresponding to the first operation mode is the screen on the second surface 312 of the first body away from the second body. As shown in the electronic device on the left side of FIG. 3, the first screen is the screen located on the second surface 312 of the first body.

In some embodiments, in the desktop mode, the angle between the first body and the second body is in the range [70°, 180° ]. The first screen corresponding to the first operation mode is the screen on the first surface 311 of the first body close to the second body. As shown in the electronic device on the left side of FIG. 3, the first screen is the screen located on the first surface 311 of the first body.

At B42, the processor determines the first screen entering the first state based on the operation mode of the electronic device to control the target application to send the first control signal.

Figure 4:
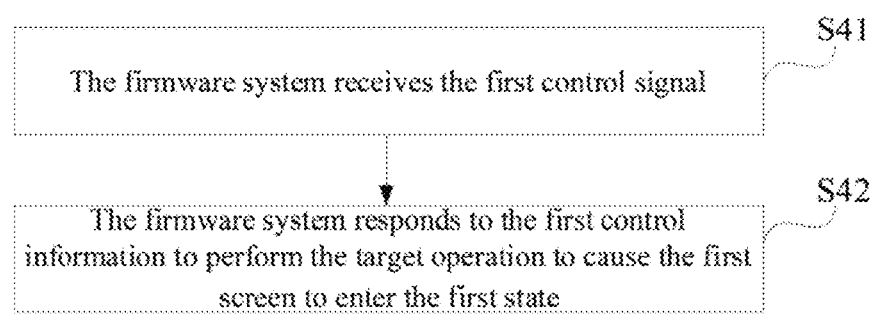
FIG. 4 illustrates a schematic flowchart of a control method applied to a firmware system according to some embodiments of the present disclosure.

FIG. 4 illustrates a schematic flowchart of a control method applied to a firmware system according to some embodiments of the present disclosure. The method include process S41 and S42.

At S41, the firmware system receives the first control signal.

In some embodiments, the first control information received by the firmware system can be from a plurality of sources. Embodiments of the present disclosure provide but are not limited to the following two sources.

In a first source, the first control signal is configured during the startup process of the electronic device.

During the startup process, the electronic device can enter the operating system interface. The user can change parameters in the firmware system to configure the first control signal in the operating system interface.

In a second source, the first control signal can be sent by the target application.

For the description of the target application sending the first control signal, reference can be made to embodiments of the control method applied to the target application, which is not repeated here.

At S42, the firmware system responds to the first control information to perform the target operation to cause the first screen to enter the first state. In the first state, the operating system cannot control the first screen. When the first screen enters the first state, the first screen remains to be electrically connected to the processor. The processor is configured to run the operating system.

In some embodiments, performing the target operation can include the firmware system modifying the first attribute information of the first screen, and the operating system determining the control situation over the first screen by reading the first attribute information.

For the process of the firmware system modifying the first attribute information of the first screen, reference can be made to the description of the firmware system modifying the first attribute information of the first screen in embodiments of the control method applied to the target application, which is not repeated here.

The control method of embodiments of the present disclosure can be applied to the target application (independent of the firmware system), the firmware system (independent of the target application), or both the target application and the firmware system.

Figure 5:
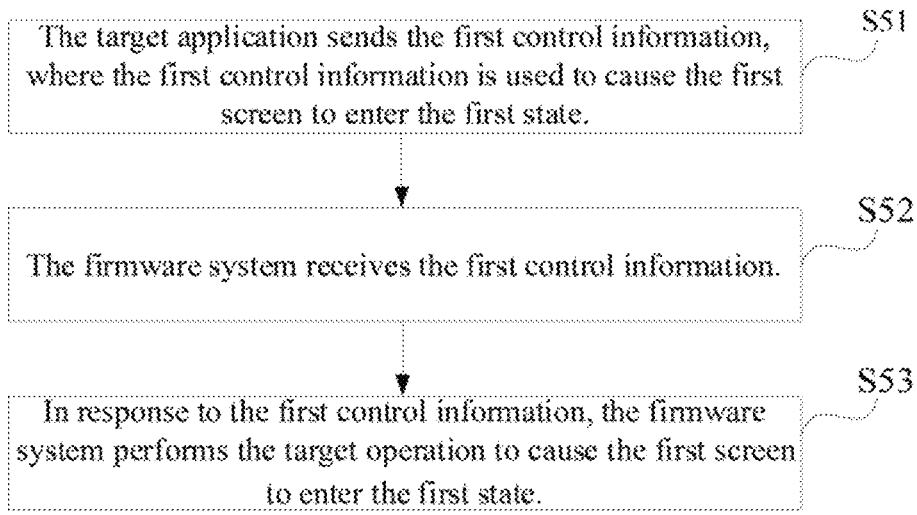
FIG. 5 illustrates a schematic flowchart of a control method applied to a target application and a firmware system according to some embodiments of the present disclosure.

FIG. 5 illustrates a schematic flowchart of a control method applied to a target application and a firmware system according to some embodiments of the present disclosure.

The method includes process S51 to process S53.

At S51, the target application sends the first control information.

At S52, the firmware system receives the first control information.

At S53, in response to the first control information, the firmware system performs the target operation to cause the first screen to enter the first state. In the first state, the operating system is not able to control the first screen. When the first screen enters the first state, the first screen remains to be electrically connected to the processor. The processor is configured to run the operating system.

The method is described in detail in embodiments of the present disclosure. The method can be realized by using a plurality of types of apparatuses. The present disclosure further provides an apparatus, which is described in detail below.

Figure 6:
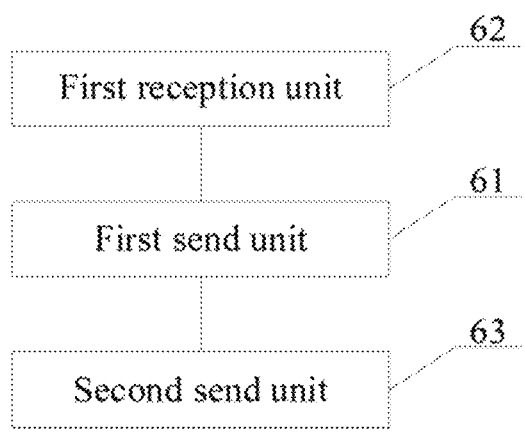
FIG. 6 illustrates a schematic block diagram of a control apparatus applied to a target application according to some embodiments of the present disclosure.

FIG. 6 illustrates a schematic block diagram of a control apparatus applied to a target application according to some embodiments of the present disclosure. The apparatus includes a first sending unit 61.

The first sending unit 61 can be configured to send the first control information. The first control information can be used to cause the first screen to enter the first state. In the first state, the operating system cannot control the first screen. When the first screen enters the first state, the first screen can remain to be electrically connected to the processor. The processor can be configured to run the operating system.

In some embodiments, the control apparatus applied to the target application further includes a first reception unit 62.

The first reception unit 62 can be configured to enable the target application to receive the first switch signal. The first switch signal can be configured to indicate switching the target screen of the electronic device from the first screen to the second screen. The target screen can be the screen for displaying the target content. The first control information can be the information sent by the target application in response to the first switch signal.

In some embodiments, the first screen and the second screen can be arranged on the electronic device. The first switch signal can be triggered by the position change structure. The position change structure can be configured to cause the second screen to move to the target position to be used as the target screen.

In some embodiments, the first sending unit can be configured for the target application to send the first control information to the firmware system of the electronic device. The firmware system can respond to the first control information to modify the first attribute information of the first screen. The operating system can determine the control situation over the first screen by reading the first attribute information.

In some embodiments, the first attribute information can be stored in the storage unit of the firmware system. The control apparatus further includes a second sending unit 63. The second sending unit 63 can be configured for the target application to send the second control information. The second control information can be used to cause the operating system to read the first attribute information from the storage unit of the firmware system.

For the apparatus described in the above embodiments and the processes for the units to perform operations, reference can be made to method embodiments, which is not repeated here.

Figure 7:
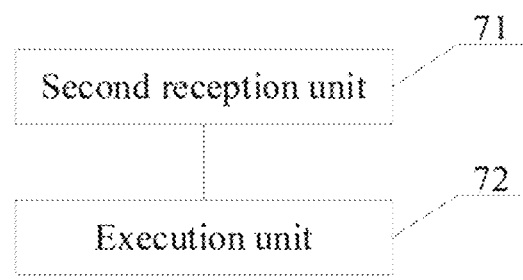
FIG. 7 illustrates a schematic block diagram of a control apparatus applied to a firmware system according to some embodiments of the present disclosure.

FIG. 7 illustrates a schematic block diagram of a control apparatus applied to a firmware system according to some embodiments of the present disclosure. The apparatus includes a second reception unit 71 and an execution unit 72.

The second reception unit 71 can be configured for the firmware system to receive the first control information.

The execution unit 72 can be configured for the firmware system to respond to the first control information to perform a target operation to cause the first screen to enter the first state. In the first state, the operating system cannot control the first screen. When the first screen enters the first state, the first screen can remain to be electrically connected to the processor. The processor can be configured to run the operating system.

In some embodiments, the first control information can be sent by the target application in response to the first switch signal. The first switch signal can be used to indicate the switching of the target screen of the electronic device from the first screen to the second screen. The target screen can be the screen for displaying the target content.

In some embodiments, performing the target operation can include the firmware system modifying the first attribute information of the first screen, and the operating system determining the control situation over the first screen by reading the first attribute information.

For the apparatus and the processes performed by the various units, reference can be made to method embodiments, which are not repeated here.

The features described in embodiments of the present disclosure can be replaced or combined with each other. For apparatus or system embodiments, since they are similar to method embodiments, apparatus or system embodiments are described simply. For relevant aspects, reference can be made to the description of method embodiments.

Furthermore, in the specification, relation terms such as "first" and "second" are used to distinguish one entity or operation from another, but do not necessarily require any actual relationship or order between these entities or operations. In addition, the terms "include," "comprise," or any other similar variants are intended to encompass non-exclusive inclusion, so that processes, methods, items, or devices including a series of elements not only include those elements but also include other elements that are implicitly listed or inherently present in those processes, methods, items, or devices. When there is no more limitation, elements limited by "including a . . . " do not exclude another identical element in the processes, methods, items, or devices including the elements.

Processes of the method or algorithm of embodiments of the present disclosure can be directly implemented using hardware, a software module executed by the processor, or a combination thereof. The software module can be stored in a random access memory (RAM), memory, a read-only memory (ROM), an electrically programmable ROM, an electrically erasable programmable ROM, a register, a hard disk, a removable disk, a CD-ROM, or any other storage medium known in the art.

The above description of embodiments of the present disclosure allows those skilled in the art to implement or use the present disclosure. It is apparent for those skilled in the art that various modifications can be made to embodiments of the present disclosure. The general principle defined in the specification can be implemented in another embodiment without departing from the spirit or scope of the present disclosure. Thus, the present disclosure is not limited to these embodiments of the present disclosure but conforms to the widest scope consistent with the principle and novel feature of the present disclosure.

What is claimed is:

1. A control method for controlling an electronic device, comprising:

sending first control information by a target application to a firmware system of the electronic device;

in responding to the first control information, modifying, by the firmware system, first attribute information of a first screen; and controlling, by a Basic Input Output System (BIOS) of the firmware system, a graphics card to reset a graphics card driver to trigger an operating system of the electronic device to reload the first attribute information, wherein:

the first control information is used to cause the first screen to enter a first state corresponding to the first attribute information;

in the first state, the operating system is not able to control the first screen based on the first attribute information, and the first screen remains electrically connected to a processor; and the processor is configured to run the operating system.

2. The method according to claim 1, further comprising:
receiving a first switch signal by the target application, wherein:

the first switch signal is used to indicate of switching of a target screen of the electronic device from the first screen to a second screen;

the target screen is a screen for displaying target content; and the first control information is information sent by the target application in response to the first switch signal.

3. The method according to claim 2, wherein:
the first screen and the second screen are arranged on the electronic device;

the first switch signal is triggered by a position change structure; and the position change structure is configured to cause the second screen to move to a target position to be used as the target screen.

4. The method according to claim 1, further comprising:
determining a control situation over the first screen by the operating system by reading the first attribute information.

5. The method according to claim 4,
wherein the first attribute information is stored in a storage unit of the firmware system, the method further comprising, after sending the first control information by the target application:

sending second control information by the target application, wherein the second control information is used to cause the operating system to read the first attribute information from the storage unit of the firmware system.

6. A control method for controlling an electronic device, comprising:

receiving first control information by a firmware system;
in responding to the first control information, performing, by the firmware system, a target operation to cause a first screen to enter a first state, the target operation including modifying first attribute information of the first screen; and controlling, by a Basic Input Output System (BIOS) of the firmware system, a graphics card to reset a graphics card driver to trigger an operating system of the electronic device to reload the first attribute information, wherein:

in the first state, the operating system is not able to control the first screen based on the first attribute information, and the first screen remains electrically connected to a processor; and the processor is configured to run an operating system.

7. The method according to claim 6, wherein:
the first control information is sent by the target application in response to a first switch signal;

the first switch signal is used to indicate switching a target screen of the electronic device from the first screen to a second screen; and the target screen is a screen for displaying target content.

8. The method according to claim 6, where the target operation further includes:

determining a control situation over the first screen by the operating system by reading the first attribute information.

9. A control apparatus comprising:
a processor configured to run an operating system; and
a first sending circuit configured to send first control information to a graphics card of an electronic device, wherein:

in responding to the first control information, the graphics card resets a graphics card driver to trigger the operating system to load first attribute information of a first screen;

the first control information includes a screen identifier of the first screen and is used to cause the first screen to enter a first state corresponding to the first attribute information;

the operating system does not obtain the first attribute information corresponding to the screen identifier of the first screen; and in the first state, the operating system is not able to control the first screen based on the first attribute information, and the first screen remains to be electrically connected to a processor.

10. The apparatus according to claim 9, wherein the processor is further configured to:

receive a first switch signal, wherein:
the first switch signal is used to indicate of switching of a target screen of an electronic device from the first screen to a second screen;

the target screen is a screen for displaying target content; and the first control information is information sent in response to the first switch signal.

11. The apparatus according to claim 10, wherein:
the first screen and the second screen are arranged on the electronic device;

the first switch signal is triggered by a position change structure; and the position change structure is configured to cause the second screen to move to a target position to be used as the target screen.

12. The apparatus according to claim 9, where the processor is further configured to:

determine a control situation over the first screen by reading the first attribute information.

13. The apparatus according to claim 12, wherein:
the first attribute information is stored in a storage unit of the firmware system; and the processor is further configured to:
send second control information, wherein the second control information is used to cause the operating system to read the first attribute information from the storage unit of the firmware system.

* * * * *